UNITED STATES PATENT OFFICE 2,489,000

N-(HYDROXY ARYL) PYRROLES AS DETERIORATION RETARDERS

Frank R. Valentine, Jr., Naugatuck, Conn., assignor to United States Rubber Company, New York, N. Y., a corporation of New Jersey No Drawing. Application November 20, 1945, Serial No. 629,922

12 Claims. (Cl. 260—45.9)

This invention relates to a new class of antioxidants or age-resisters for organic substances which tend to deteriorate by absorption of oxygen from the air, e. g., rubber or allied gums, unsaturated fatty oils, such as unsaturated vegetable oils, essential oils, petroleum oils and their derivatives, such as gasolines, soaps, aldehydes, synthetic resins, turpentine, insecticides, such as derris root, cube root and pyrethrum, and the like.

According to the invention, the organic substances are incorporated with an N-(hydroxyaryl)-pyrrole having the general formula

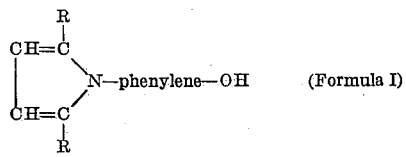 (Formula I)

wherein N, H, and C represent nitrogen, hydrogen, and carbon respectively; phenylene refers to a divalent benzene ring; and R refers to hydrogen, alkyl, or aryl. Formula II is given to show the numbering used in the general Formula I of the compounds

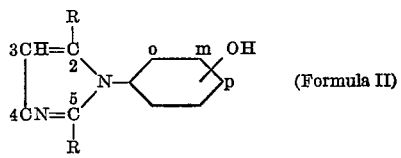 (Formula II)

Exemplary of such compounds are the following:

N-(p-hydroxy phenyl)-2,5-dimethyl pyrrole
N-(p-hydroxy phenyl)-2,5-diethyl pyrrole
N-(p-hydroxy phenyl)-2,5-dibutyl pyrrole
N-(o-hydroxy phenyl)-2,5-dimethyl pyrrole
N-(m-hydroxy phenyl)-2,5-dimethyl pyrrole
N-(p-hydroxy phenyl)-pyrrole
N-(o-hydroxy phenyl)-pyrrole
N-(p-hydroxy phenyl)-2,5-diphenyl pyrrole
N-(o-hydroxy phenyl)-2,5-diphenyl pyrrole In general, these pyrroles may be prepared by refluxing a solution of the primary amino compound and a 1,4-dicarbonyl compound in a suitable solvent, such as ethanol, methanol, or water. No catalyst is necessary, but usually the addition of a trace of acid, such as acetic acid, hastens the reaction of the two components. Examples of the 1,4-dicarbonyl compounds which may be used are acetonyl acetone, 1,2-dibenzoylethane, and succinic dialdehyde.

More specifically, in illustration, N-(p-hydroxy phenyl)-2,5-dimethyl pyrrole may be prepared by dissolving 109 grams (1 mole) of p-amino phenol in 400 cc. of alcohol, adding 125 grams of acetonyl acetone (1 mole), 15 drops of glacial acetic acid and refluxing the solution 4-5 hours. The mixture is cooled, 15 drops of 35% sodium hydroxide added, and the alcohol removed in vacuo. The residue on distillation in vacuum yields 164 grams (88%) of N-(p-hydroxy phenyl)-2,5-dimethyl pyrrole, boiling range 145–150° C. at 1 mm., a yellow oil crystallizing on cooling and melting at 99–102° C.

These compounds are useful as preservatives for rubber, and may be applied especially for stabilizing an uncured rubbery butadiene-styrene copolymer (GRS) against the effects of heat. As an example, 1.5 parts of N-(p-hydroxy phenyl)-2,5-dimethyl pyrrole are added to 100 parts of the unstabilized butadiene-styrene copolymer and samples placed in an oven at 212° F. The samples are examined periodically and the test discontinued when the samples show any resinification or cracking. The time in hours to this point is given in the table.

Table I

| Chemical | Duplicate Tests, Hours to Cracking | |
|---|---|---|
| N-(p-hydroxy phenyl)-2,5-dimethyl pyrrole | 336 | [1] 360 |

[1] Test stopped at the end of this time.

The N-(hydroxy aryl) pyrroles disclosed herein are uniquely superior, as antioxidation catalysts, to the corresponding N-(amino aryl) pyrroles. For example, in a similar test to the above, 1.5 parts of N-(p-amino phenyl)-2,5-dimethyl pyrrole, gave protection, in duplicate tests for but 24 and 48 hours. Control stocks containing no antioxidant resinify in about 24 hours.

This invention may be applied to the preservation of, broadly, natural rubber compositions as well as artificially-prepared rubber compositions, such as polychloroprene, olefin polysulfides, butadiene polymers, modified butadiene polymers (Buna N and Buna S), and including reclaims, and latices of such compositions.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surface of vulcanized or unvulcanized rubber goods.

Having thus described my invention, what I claim and desire to protect by Letters Patent is:

1. An uncured rubbery butadiene-styrene copolymer composition containing from 0.1 to 5 percent of an N-(hydroxyphenyl) pyrrole.
2. An uncured rubbery butadiene-styrene copolymer composition containing from 0.1 to 5 percent of an N-(p-hydroxy phenyl)-2,5-dialkyl pyrrole.
3. An uncured rubbery butadiene-styrene copolymer composition containing from 0.1 to 5 percent of N-(p-hydroxy phenyl)-2,5-dimethyl pyrrole.
4. A sulfur-vulcanizable rubber composition containing from 0.1 to 5 percent of an N-(hydroxy phenyl) pyrrole, and in which the sulfur-vulcanizable rubber is from the class consisting of natural rubber, and butadiene-styrene copolymer synthetic rubber.
5. A sulfur-vulcanizable rubber composition containing from 0.1 to 5 percent of an N-(p-hydroxy phenyl)-2,5-dialkyl pyrrole, and in which the sulfur-vulcanizable rubber is from the class consisting of natural rubber, and butadiene-styrene copolymer synthetic rubber.
6. A sulfur-vulcanizable rubber composition containing from 1.0 to 5 percent of N-(p-hydroxy phenyl)-2,5-dimethyl pyrrole, and in which the sulfur-vulcanizable rubber is from the class consisting of natural rubber, and butadiene-styrene copolymer synthetic rubber.
7. A rubbery butadiene-styrene copolymer composition containing from 0.1 to 5 percent of an N-(hydroxy phenyl) pyrrole.
8. A rubbery butadiene-styrene copolymer composition containing from 0.1 to 5 percent of an N-(p-hydroxy phenyl)-2,5-dialkyl pyrrole.
9. A rubbery butadiene-styrene copolymer composition containing from 0.1 to 5 percent of N-(p-hydroxy phenyl)-2,5-dimethyl pyrrole.
10. A natural rubber composition containing from 0.1 to 5 percent of an N-(hydroxy phenyl) pyrrole.
11. A natural rubber composition containing from 0.1 to 5 percent of an N-(p-hydroxy phenyl)-2,5-dialkyl pyrrole.
12. A natural rubber composition containing from 0.1 to 5 percent of N-(p-hydroxy phenyl)-2,5-dimethyl pyrrole.

FRANK R. VALENTINE, Jr.

REFERENCES CITED

The following references are of record in the file of this patent:

UNITED STATES PATENTS

| Number | Name | Date |
| --- | --- | --- |
| Re. 19,654 | Reed | July 23, 1935 |
| 2,276,932 | Coleman | Mar. 17, 1942 |
| 2,324,056 | Barton | July 13, 1943 |

OTHER REFERENCES

Hazlewood et al., Journal Proceedings Royal Society of New South Wales, pages 921-102, March 1937.

Certificate of Correction

November 22, 1949

Patent No. 2,489,000

FRANK R. VALENTINE, Jr.

It is hereby certified that errors appear in the printed specification of the above numbered patent requiring correction as follows:

Column 1, line 30, for that portion of the formula reading "4CN=C" read 4CH=C; column 4, line 1, for "1.0" read 0.1;
and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*